(12) United States Patent
Landau et al.

(10) Patent No.: US 7,703,639 B2
(45) Date of Patent: Apr. 27, 2010

(54) GRANULAR PRODUCT DISPENSING SYSTEM

(75) Inventors: Ofer Landau, Even Yehuda (IL); Gil Gold, 1520 Central St., Evanston, IL (US) 60201; Tamir Levy, 1520 Central St., Evanston, IL (US) 60201

(73) Assignees: Tamir Levy, Evanston, IL (US); Gil Gold, Evanston, IL (US)

( * ) Notice: Subject to any disclaimer, the term of this patent is extended or adjusted under 35 U.S.C. 154(b) by 490 days.

(21) Appl. No.: 11/190,053

(22) Filed: Jul. 27, 2005

(65) Prior Publication Data

US 2006/0027609 A1    Feb. 9, 2006

Related U.S. Application Data

(63) Continuation-in-part of application No. 10/178,512, filed on Jun. 25, 2002, now Pat. No. 6,964,355.

(51) Int. Cl.
   *G01F 11/00* (2006.01)
(52) U.S. Cl. .................. 222/1; 222/138; 222/342; 222/368
(58) Field of Classification Search .......... 222/108, 222/185.1, 342, 367–368, 410, 138, 1; 141/391
   See application file for complete search history.

(56) References Cited

U.S. PATENT DOCUMENTS

| 852,603 | A | * | 5/1907 | Hanlon | 222/368 |
|---|---|---|---|---|---|
| 853,769 | A | * | 5/1907 | Caviglia | 222/340 |
| 895,346 | A | * | 8/1908 | Dacosta | 222/338 |
| 1,022,774 | A | * | 4/1912 | De Julio | 222/368 |
| 2,029,056 | A | * | 1/1936 | Carlson | 401/208 |
| 2,259,710 | A | * | 10/1941 | Stern | 222/41 |
| 2,575,967 | A | * | 11/1951 | May | 222/39 |
| 2,853,172 | A | * | 9/1958 | Angell | 194/350 |
| 2,920,796 | A | * | 1/1960 | Field | 222/185.1 |
| 3,033,164 | A | * | 5/1962 | Evers | 119/54 |
| 3,169,675 | A | * | 2/1965 | Gutzmann et al. | 222/360 |
| 3,204,833 | A | * | 9/1965 | Weitzner | 222/355 |
| 3,231,105 | A | * | 1/1966 | Easley, Jr. | 414/325 |
| 3,603,001 | A | * | 9/1971 | Arnold et al. | 34/136 |
| 3,735,899 | A | * | 5/1973 | Rollinson | 222/135 |
| 3,830,357 | A | * | 8/1974 | West et al. | 198/527 |
| 4,162,751 | A | * | 7/1979 | Hetland et al. | 222/293 |
| 4,238,058 | A | * | 12/1980 | Heth | 222/368 |

(Continued)

*Primary Examiner*—Kevin P Shaver
*Assistant Examiner*—Andrew P Bainbridge
(74) *Attorney, Agent, or Firm*—Edward Langer, Adv.; Law Offices of Edward Langer

(57) ABSTRACT

A system for dispensing a granular product. The system includes a refillable, sealable receptacle, having a neck at its lower end, a rotatable and flexible impeller within the neck, with the shape and size of the impeller conforming generally to the shape and size of the neck, providing sealing for maintaining the freshness of the granular product. Preferably the impeller comprises a hollow central core, and a shaft extends through the hollow core into at least one through-hole formed in the neck. A handle is present for turning the shaft to rotate the impeller. A base is provided with a retaining arm for removably receiving the receptacle. The system is capable of easy disassembly for cleaning, by removal of the receptacle and impeller from within the receptacle. Also provided is a multi-system for dispensing a plurality of products; having several receptacles and associated dispensing mechanisms mounted on a single support.

40 Claims, 13 Drawing Sheets

U.S. PATENT DOCUMENTS

| | | | |
|---|---|---|---|
| 4,427,135 A * | 1/1984 | MacKay et al. | 222/368 |
| 4,619,379 A * | 10/1986 | Biehl | 222/153.14 |
| 4,768,683 A * | 9/1988 | Gold et al. | 222/328 |
| 4,823,993 A * | 4/1989 | Siegel et al. | 222/345 |
| RE33,083 E * | 10/1989 | Pellegrino | 222/288 |
| 4,899,908 A * | 2/1990 | Kardiak | 222/1 |
| 4,957,219 A * | 9/1990 | Robbins et al. | 222/39 |
| 5,245,914 A * | 9/1993 | Vitous | 99/280 |
| 5,303,672 A * | 4/1994 | Morris | 119/51.11 |
| 5,307,963 A * | 5/1994 | Mitchell | 222/368 |
| 5,353,692 A * | 10/1994 | Reese et al. | 99/289 T |
| 5,375,744 A * | 12/1994 | Henderson | 222/306 |
| 5,501,176 A * | 3/1996 | Tully | 119/61.57 |
| 5,685,460 A * | 11/1997 | Vlastuin | 222/154 |
| 5,694,794 A * | 12/1997 | Jerg et al. | 68/17 R |
| 5,823,398 A * | 10/1998 | Russillo et al. | 222/185.1 |
| 5,826,754 A * | 10/1998 | Ishaya et al. | 222/185.1 |
| 5,833,097 A * | 11/1998 | Ruth | 222/368 |
| D402,153 S * | 12/1998 | Saltet | D7/309 |
| 5,927,558 A * | 7/1999 | Bruce | 222/185.1 |
| 5,947,336 A * | 9/1999 | Thompson | 222/153.13 |
| 5,960,995 A * | 10/1999 | Leatherman et al. | 222/108 |
| 6,029,828 A * | 2/2000 | Robbins et al. | 211/78 |
| 6,095,031 A * | 8/2000 | Warne | 99/282 |
| 6,176,397 B1 * | 1/2001 | Robbins et al. | 222/144 |
| 6,308,860 B2 * | 10/2001 | Eagle | 221/131 |
| 6,318,600 B1 * | 11/2001 | Winnett et al. | 222/173 |
| D467,045 S * | 12/2002 | Tsengas | D30/130 |
| 6,523,726 B1 * | 2/2003 | Tschantz | 222/353 |
| 6,779,691 B2 * | 8/2004 | Cheng | 222/368 |
| 6,951,294 B1 * | 10/2005 | Laberinto | 222/142 |
| 6,964,355 B2 * | 11/2005 | Landau | 222/185.1 |
| 6,966,466 B2 * | 11/2005 | Jensen | 222/368 |
| 7,083,069 B2 * | 8/2006 | Wysong et al. | 222/129 |
| D531,457 S * | 11/2006 | Gold et al. | D7/589 |
| D562,079 S * | 2/2008 | Shlomo et al. | D7/589 |
| 2006/0027609 A1* | 2/2006 | Landau et al. | 222/434 |

* cited by examiner

GRANULAR PRODUCT DISPENSING SYSTEM

CROSS-REFERENCE TO RELATED APPLICATIONS

The present application is a continuation-in-part of U.S. patent application Ser. No. 10/178,512 filed Jun. 25, 2002 now U.S. Pat. No. 6,964,355.

FIELD OF THE INVENTION

The present invention relates to dispensing systems for granular products, and is especially suited for use as a system for storing and dispensing a predetermined quantity of a food product such as a breakfast cereal.

BACKGROUND OF THE INVENTION

In private homes, ready-to-eat breakfast cereal is generally either stored in the box in which it was purchased or transferred to a sealed receptacle for storage. The consumer then transfers the desired amount of cereal to his serving bowl by pouring or scooping.

Hotels, restaurants, residential institutions and other establishments in which breakfast buffets are available frequently present breakfast cereals in large bowls to which, the consumer may help himself using a scoop. There are many disadvantages associated with these storage and dispensing arrangements.

Firstly, spillage frequently occurs during transfer of the cereal from the storage bowl to the consumer's bowl, causing wastage and mess.

Secondly, freshness is not preserved. If cereal is stored in its original box, air may enter the box and cereal at the bottom of the box may become stale before consumption. In the case of the storage bowl or receptacle, no continual flow of fresh product is maintained, since the bowl or receptacle may be repeatedly refilled from above, resulting in stale cereal remaining at the bottom.

Thirdly, these methods are not hygienic, since the food is exposed to contamination by dust, insect matter and other airborne particles. Such contamination may occur even if the box is closed or a cover is provided, since each consumer must remove the cover prior to helping himself to cereal. Furthermore, the cereal may inadvertently be touched by the consumer during the scooping process.

Fourthly, crushing of the cereal frequently occurs during scooping, resulting in product wastage.

Various solid food devices comprising an enclosed receptacle with an attached dispensing mechanism have been developed to alleviate the problems associated with unsanitary storage and dispensing methods.

However, the majority of conventional dispensers are extremely hard to dissasemble and clean efficiently, since they often contain a multitude of minute components in various three-dimensional planes, which cannot be easily removed or cleaned. This results in a non-hygienic food dispensing system, or requires considerable time and effort to be regularly invested in cleaning the system. For instance, U.S. Pat. No. 2,920,796 to Field describes a dispenser having a multitude of parts. Such systems having a large number of specialized components are expensive to manufacture and difficult to assemble. The need exists for a simple dispensing system which, having a limited number of components, is inexpensive to manufacture and is easy to use and to wash.

Another fundamental disadvantage of conventional systems lies in their failure to provide sealing of the product in the storage section of the dispenser, therefore a food product stored for several days tends to become stale.

Furthermore, most of the known bulk food dispensers cause considerable breakage and crushing of fragile foods such as breakfast cereals. Dispensers which have been described as being suitable for breakfast cereals have a tendency to become jammed. Prior art dispensers are additionally limited since they often do not have a portion control mechanism. In such dispensers, when the dispensing aperture is opened, product will continuously be dispensed, in an unmeasured manner, so that during dispensing the product tends to overflow and spill out of the bowl.

A great need exists for a dispensing system that allows sanitary dispensing of pet food, which is often sold in hefty-sized bags, into which a pet owner often will insert a bowl to remove a portion for use, in a repetitive, and potentially unsanitary manner. The pet food within a large-sized bag is open to the air, so that it will rapidly become stale and airborne micro-organisms may easily enter. Additionally, when pet food is stored within a large-sized bag, the malodor of the pet food tends to disperse within the room.

It would therefore be desirable to provide a closed, hygienic dispensing system for granular products which does not cause breakage of fragile product, which provides freshness-sealing of the product within a storage area prior to dispensing, and which is simple to use and maintain.

SUMMARY OF THE INVENTION

Accordingly, it is an object of the present invention to overcome the disadvantages of the prior art and provide a dispenser which causes minimal breakage of a granular product, in which the components of the system may be quickly and easily disassembled for cleaning and in which the product is sealed in a storage section until required.

In accordance with a preferred embodiment of the present invention there is provided a dispenser for a granular product comprising a receptacle which can be filled with the product and a flexible impeller fixed within the receptacle. The impeller has measuring compartments for measuring and dispensing a predetermined amount of the product. The shape, the dimensions and the flexible material of the impeller ensure that the impeller forms a seal at the dispensing end of the receptacle, maintaining the hygiene and freshness of the granular product. A lid is provided to seal the upper end of the receptacle, so that the product is stored in a substantially air-tight compartment prior to dispensing.

There is thus provided a system for measuring and dispensing predetermined amounts of a granular product, comprising a refillable, sealable receptacle and capable of containing a quantity of a granular product. The receptacle is provided with a neck at its lower end, and the neck terminates in a dispensing aperture. A rotatable and flexible impeller is provided within the neck of the receptacle for measuring and dispensing the predetermined quantity of the product. A handle is present for turning the shaft to rotate the impeller.

A support is included, comprising: a base, and retaining means for removeably receiving the receptacle therein.

The system is capable of easy disassembly for cleaning; the disassembly is performed by removal of the receptacle from the retaining means and by removal of the shaft and impeller from the receptacle.

A feature of the present invention is the provision of a system for maintaining a ready-to-eat granular product under freshness-sealed conditions prior to dispensing of the product without breakage of pieces of the product during storage or dispensing.

A further advantage of the present invention is that the system is easy to fill and maintain.

According to one embodiment, the impeller comprises a hollow central core, with a shaft extending into the hollow core of the impeller into at least one through-hole formed in the side of the neck. The shaft is retained in the horizontal plane, within the neck.

According to another embodiment, the diameter or radial cross-section of the impeller as measured across two generally opposing blades, is similar to, or slightly larger than the diameter or radial cross-section of the neck, providing sealing of said neck.

There is also provided a multi-system for measuring and dispensing a predetermined quantity of a plurality of granular products. The multi-system comprises a plurality of receptacles, each with its associated dispensing impeller and handle as described herein. A single base having a plurality of retaining means for removably receiving the receptacles therein supports the receptacles.

Additional features and advantages of the invention will become apparent from the following drawings and description.

BRIEF DESCRIPTION OF THE DRAWINGS

The present invention is herein described, by way of example only, with reference to the accompanying drawings, in which like numerals designate corresponding sections or elements throughout, and in which.

DETAILED DESCRIPTION OF THE PREFERRED EMBODIMENTS

The system of the invention is appropriate for use in dispensing granular products. It is especially suited for dispensing granular food products as these products are regularly dispensed in predetermined amounts, and their freshness must be maintained, while breakage or crushing of the product is best avoided. However, the scope of the invention is not limited for use with food products, and freshness-sealing is often important for storage of other products that can be dispensed using the invention.

Throughout the description, the granular product dispensed is often described as being cereal, however the scope of the invention is not limited to cereal. Many other granular products may be dispensed using the invention, for instance, coffee, soup almonds, nuts, candy, pretzels, confections, snacks, rice and beans are but a few of the many products for which the dispenser of the invention is suited.

Figure 1:
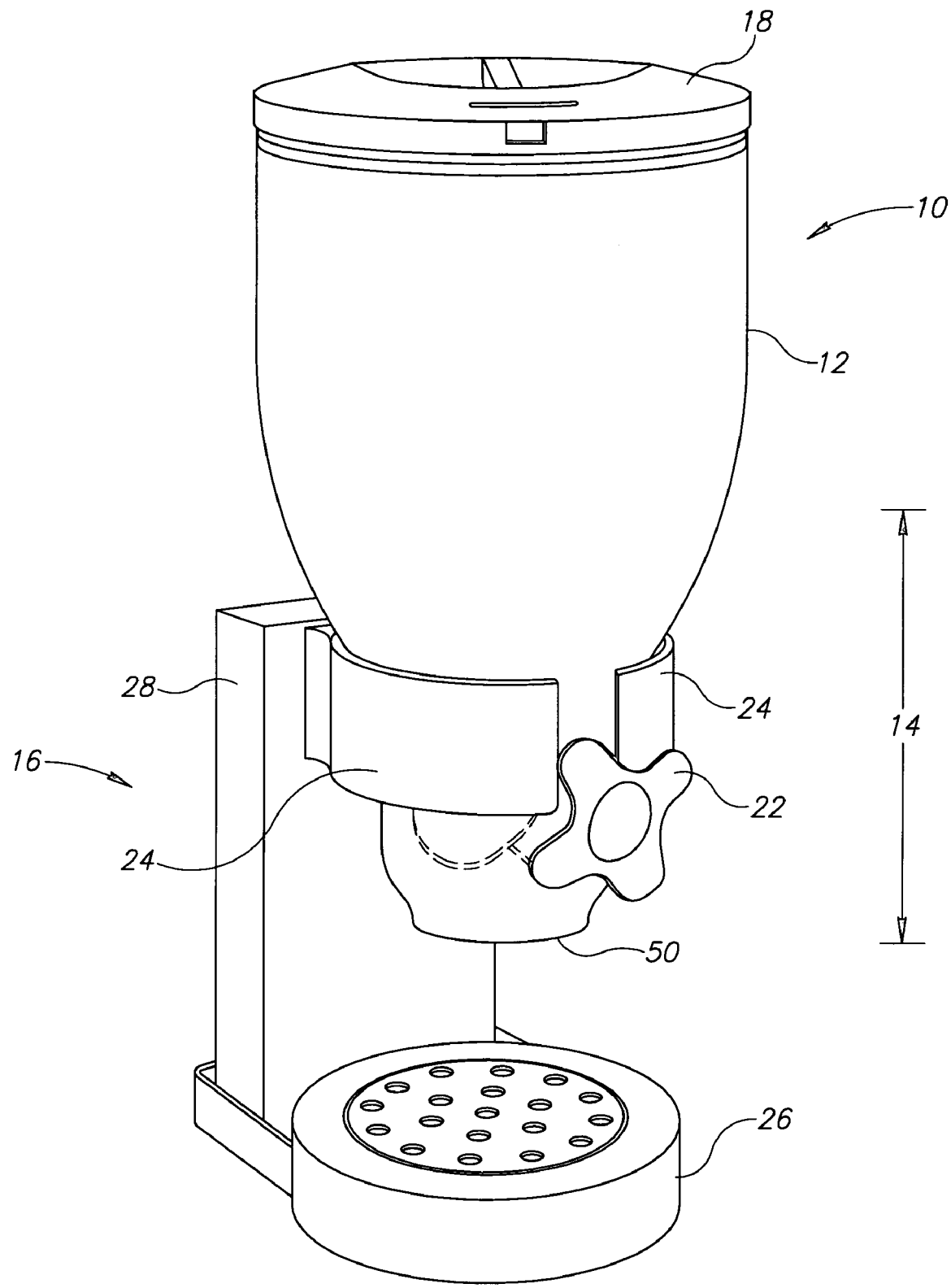
FIG. 1 shows a dispensing system of the present invention, having a horizontal base and a horizontal retaining arm receiving the receptacle.

Referring now to FIG. 1, there is a shown a dry food dispensing system 10, constructed and operated in accordance with the principles of the present invention, for use in dispensing breakfast cereals. System 10 comprises a receptacle 12 for containing breakfast cereal, provided at its lower end with a funnel 14. In this embodiment, the receptacle 12 is supported by a stand 16, for placement upon a table or countertop. Funnel 14 has a narrowed neck within which is provided a dispensing mechanism (shown in FIG. 2), operated by a handle 22.

Receptacle 12 has a dispensing aperture 50 at the open lower end of the receptacle. A removable lid 18 seals the upper end of the receptacle 12. Lid 18 minimizes contamination by airborne particles and may be easily removed for refilling of receptacle 12 with cereal. Receptacle 12 may optionally be formed of a transparent material, enabling the contents of the receptacle to be viewed by the consumer.

Stand 16 comprises an upper horizontal arm 24, in which receptacle 12 is removably retained, a horizontal base 26 and a vertical portion 28 to maintain a spaced relationship between base 26 and arm 24. A bowl (not shown) may be positioned on base 26 to receive a predetermined quantity of cereal.

Figure 2:
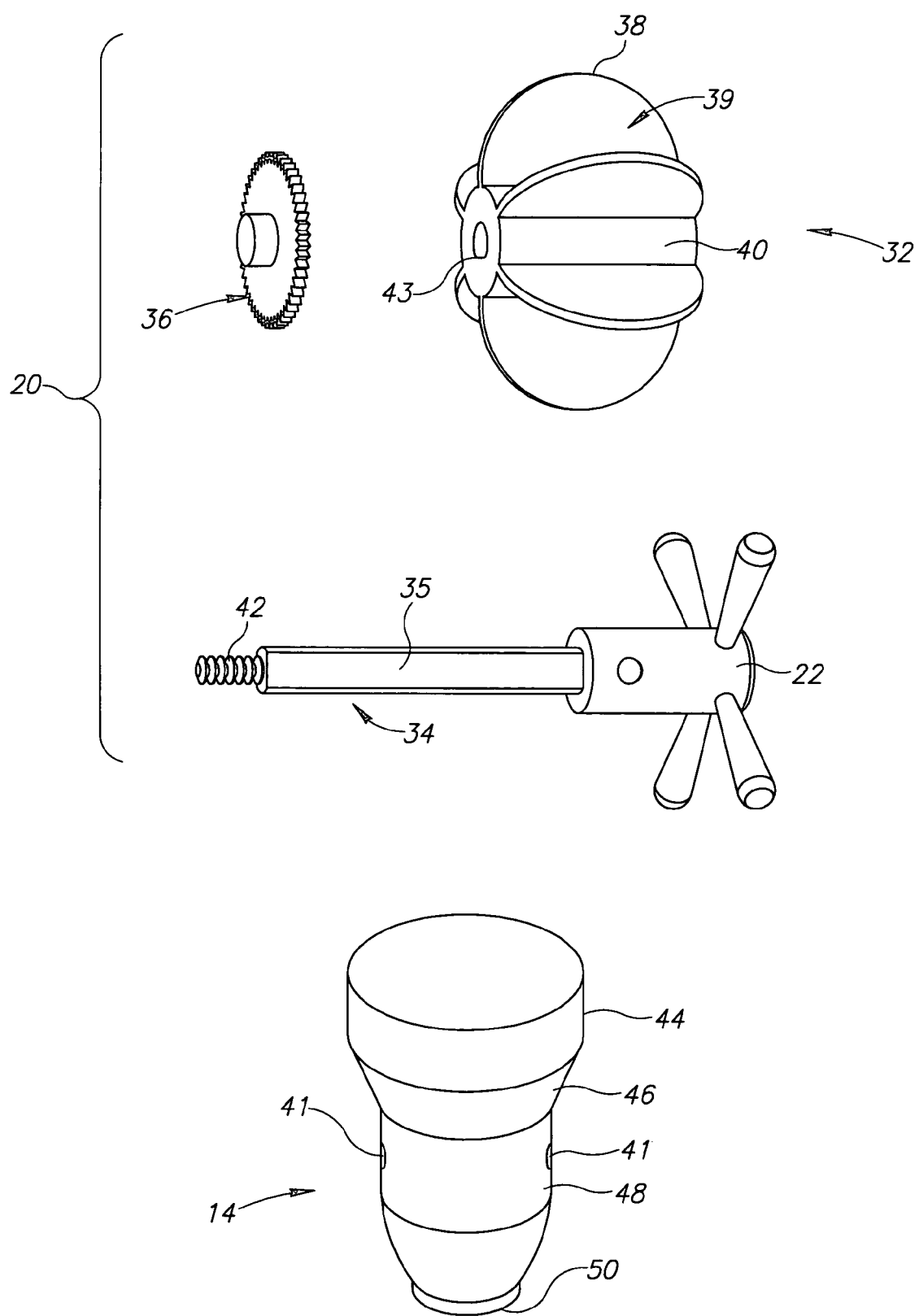
FIG. 2 shows an exploded view of the dispensing system of FIG. 1.

Referring now to FIG. 2, a preferred dispensing mechanism 20 is shown. Mechanism 20 comprises an impeller 32, a shaft 34 provided with a handle 22, and a plastic nut 36.

According to one embodiment, the impeller 32 comprises a plurality of semicircular flexible blades 38 radiating outwards from a hollow central core 40. Other shapes of impeller blades are possible, such as rectangular or trapezoid, and the impeller blades are not limited to having a semicircular shape. Core 40 is shaped as an elongated cylinder with an inner flat side 43, and is open at each end. A dispensing compartment 39 is formed between each pair of adjacent blades 38. Impeller 32 is formed from a flexible material such as silicone or rubber, having sufficient flexibility to prevent breakage of the cereal pieces.

Referring to the bottom of FIG. 2, the funnel 14 is shown, which is present at the lower portion of the receptacle. Receptacle upper portion, in which granular food product is stored before dispensing, is not shown in FIG. 2. Funnel 14 comprises in this embodiment, a wide mouth portion 44 above which the cereal is stored prior to dispensing, a central tapering section 46, and a neck portion 48 having an open lower end, providing a dispensing aperture 50. Neck 48 is provided in this embodiment with a pair of diametrically opposite through holes 41.

The shape and size of the impeller conforms generally to the shape and size of neck 48, providing sealing of the neck 48, and maintaining the hygiene and freshness of the contents of system 10. In the preferred embodiment, this is accomplished since the diameter of the impeller 32 as measured across two generally opposing blades is similar to or slightly larger than the diameter of dispensing aperture 50 of neck 48. In an impeller that does not have semi-circular blades, the radial cross-section of the impeller is similar to or slightly larger than the diameter of dispensing aperture 50 of neck 48. The flexible nature of the impeller blades 38, allows the diameter (or radial cross section) of the impeller 32 to be similar to or slightly larger than that of the neck 48, so that the impeller blades 38 tightly seal the neck 48 to maintain the freshness of the product. The edges of the impeller blades can flexibly conform to fit into the narrow neck, while still allowing sufficient ease of rotation of the impeller for dispensing the product.

Referring to the center of FIG. 2, shaft 34 comprises an elongated cylinder having a flat side 35. Shaft 34 is provided at one end with a handle 22 and at its other end with a threaded arrangement 42, which mates with the interior of the plastic nut 36, for securing the shaft in through holes 41. Handle 22 may be formed from plastic, metal or other suitable material.

Flat side 43 of core 40 mates with flat side of shaft 35, and after assembly of system, aids in ensuring that rotation of handle 22 results in propelling of the impeller 32.

Figure 3A:
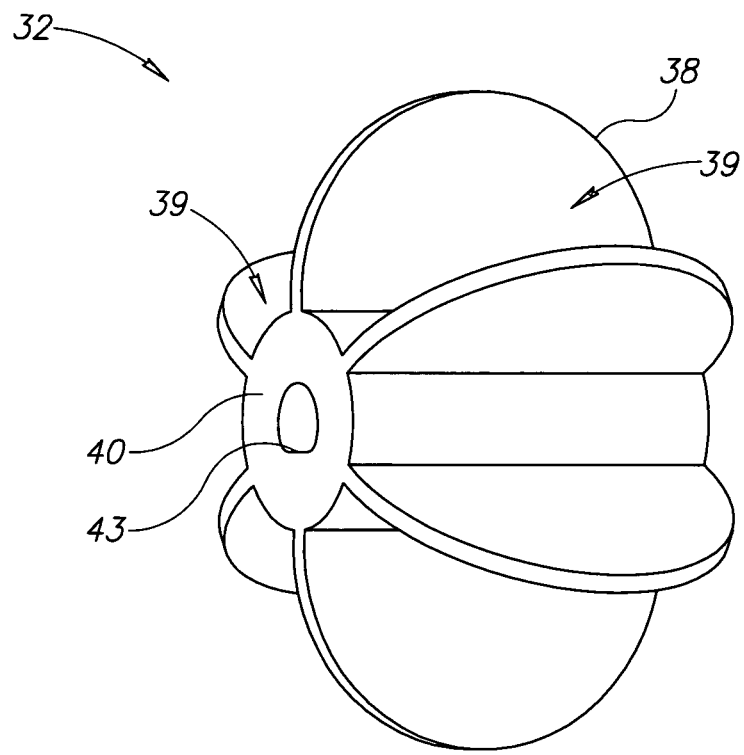
FIGS. 3A and 3B show a perspective and front view respectively of an impeller according to one embodiment of the dispensing system of FIG. 1.
Figure 3B:
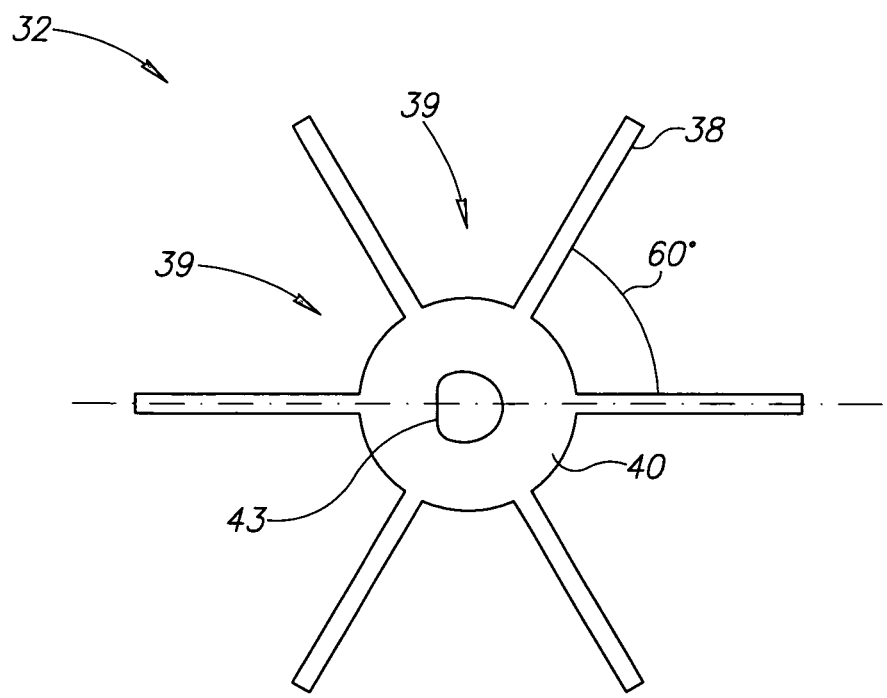

Referring now to FIGS. 3a and 3b, impeller 32, comprising a series of flexible semicircular blades 38 attached to a central core 40, is shown. The serving compartments 39 (also termed "measuring compartments") formed between adjacent blades 38 may be clearly seen. Portion control is achieved via these measuring compartments, which ensure that a predetermined amount of product is dispensed with each rotation of the handle.

Flat side 43 of core 40 is shown in FIGS. 3a, 3b.

The optimal size of impeller 32 depends on the average size of the individual food pieces being dispensed. System 10 may be adapted for use in dispensing granular products other than breakfast cereal by increasing or decreasing the angle between adjacent blades 38 in order to regulate the serving portion dispensed. Providing impeller 32 with a larger number of blades 38 will therefore decrease the angle between blades, resulting in smaller serving portions, making the system suitable for dispensing coffee, soup almonds, nuts, candy, pretzels, confections, snacks, rice and beans. For instance, an impeller having 10 to 12 blades is suited for dispensing coffee and rice. Providing the impeller with fewer blades will result in larger serving portions (larger measuring compartments), which would be suitable, for instance in dispensing pet food. The length of the impeller may be altered as well, to similarly alter the serving size, as necessary, without changing the number of blades (an elongated impeller, for instance, will have larger serving compartments).

Figure 4:
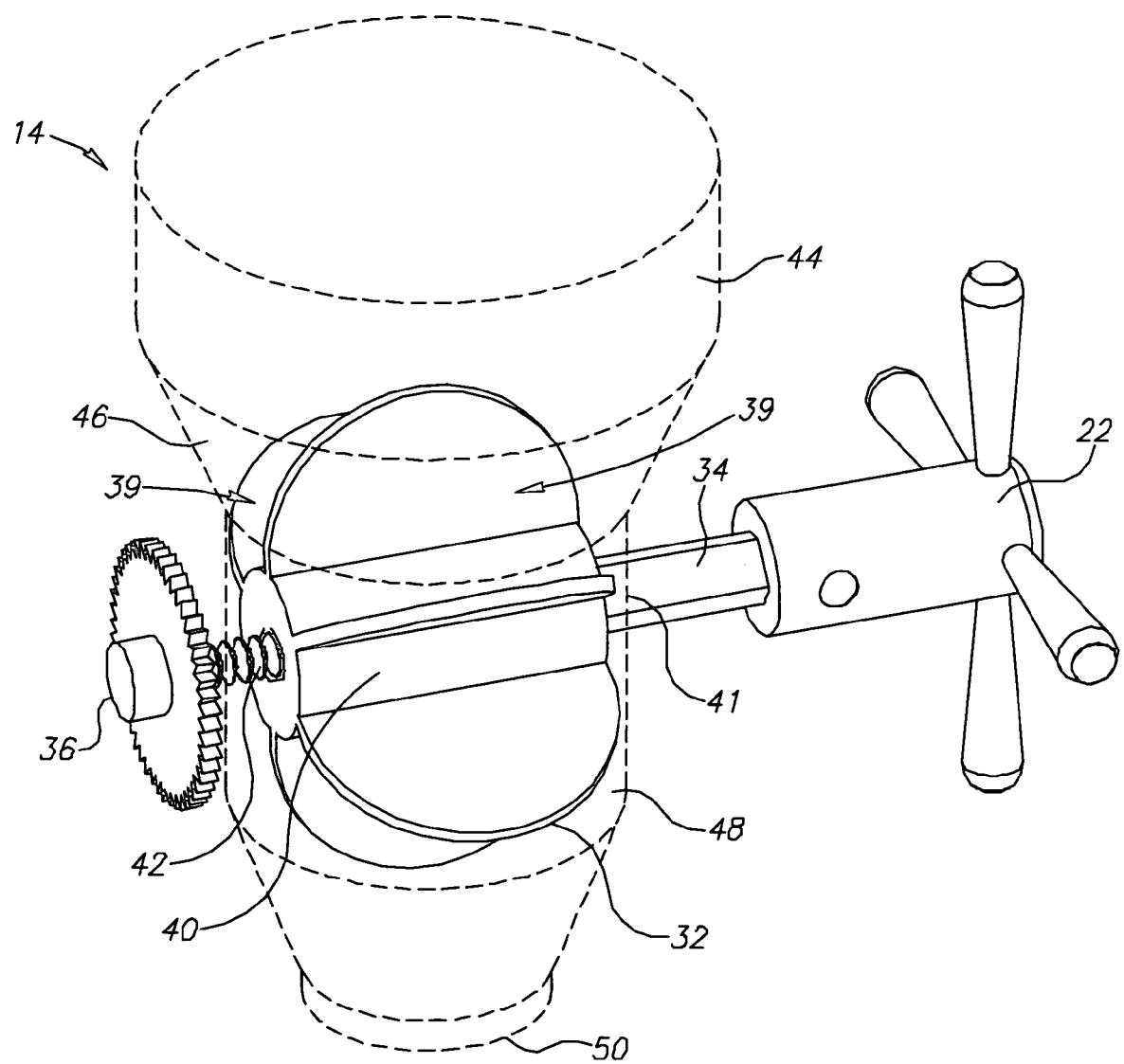
FIG. 4 shows the assembled components of the mechanism of FIG. 2.

Referring now to FIG. 4, in order to assemble system 10, impeller 32 is positioned in neck 48 of funnel 14 with the open ends of hollow core 40 aligned with the through holes 41 formed in neck 48. Shaft 34 is inserted into one through hole and through hollow core 40 of impeller 32, with flat side 35 of shaft 34 aligned with flat side 43 of impeller core 40, and such that threaded end 42 protrudes slightly through the far end of core 40, and protrudes from second through hole. Shaft 34 may then be fixed in position by screwing plastic nut 36 onto threaded end 42. Assembly of the system is simple and straightforward, and can be accomplished in approximately one minute.

Following assembly of system 10, lid 18 of receptacle 12 (both shown in FIG. 1) may be removed and receptacle 12 filled with the cereal to be dispensed. Lid 18 is then replaced to seal system 10 from above. Flexible impeller 32, having diameter or general shape similar to that of neck 48 of funnel 44, provides sealing of neck 48, maintaining the hygiene and freshness of the contents of system 10. Receptacle 12 is placed within retaining arms 24 of support 16.

A first serving compartment 39 formed between two adjacent blades 38 is positioned facing upwards to receive cereal from receptacle 12, so that on filling of receptacle 12, cereal passes through the lower end of receptacle 12, into funnel 44, and thereafter into first serving compartment 39. Handle 22 may then be turned to rotate impeller 32, and this rotation causes alignment of an adjacent serving compartment with funnel 44, and subsequent filling of the adjacent serving compartment. Handle 22 is further turned in the same direction until filled compartment 39 becomes aligned with dispensing aperture 50 of funnel 14. Cereal is thereby discharged through the dispensing aperture 50. By positioning a bowl below dispensing aperture 50, cereal will be dispensed into the bowl.

System 10 can be easily disassembled for cleaning. In disassembly, receptacle 12 is removed from retaining arm 24, nut 36 (if present) is unscrewed, handle 22 is pulled outwards, to remove the handle 22 and the shaft 34 from the through-holes 41. The pulling action will remove shaft 34 from within the hollow core 40 of the impeller 32. Impeller 32 will remain unfastened within the receptacle 12, and can then be removed by lifting lid 18 and reaching into the receptacle 12 from above. Each component may be washed using conventional detergents.

Operation and cleaning of the system is simple, due to the small number of working parts present in the system, so that even a child may operate the system, disassemble the system for cleaning and reassemble it for use. All moving parts (impeller, shaft and handle) mate together in a straightforward manner, similar to a child's interlocking building blocks. The manufacturing cost is lowered due to the simplicity of design (small number of parts necessary).

The system of the invention was designed to save space, since the receptacle is narrow and tall, and requires a minimum of counter or tabletop space. This in contrast to many prior art cereal dispensers, where the storage receptacles are often squat and broad, requiring a great deal of counter space.

Figure 5:
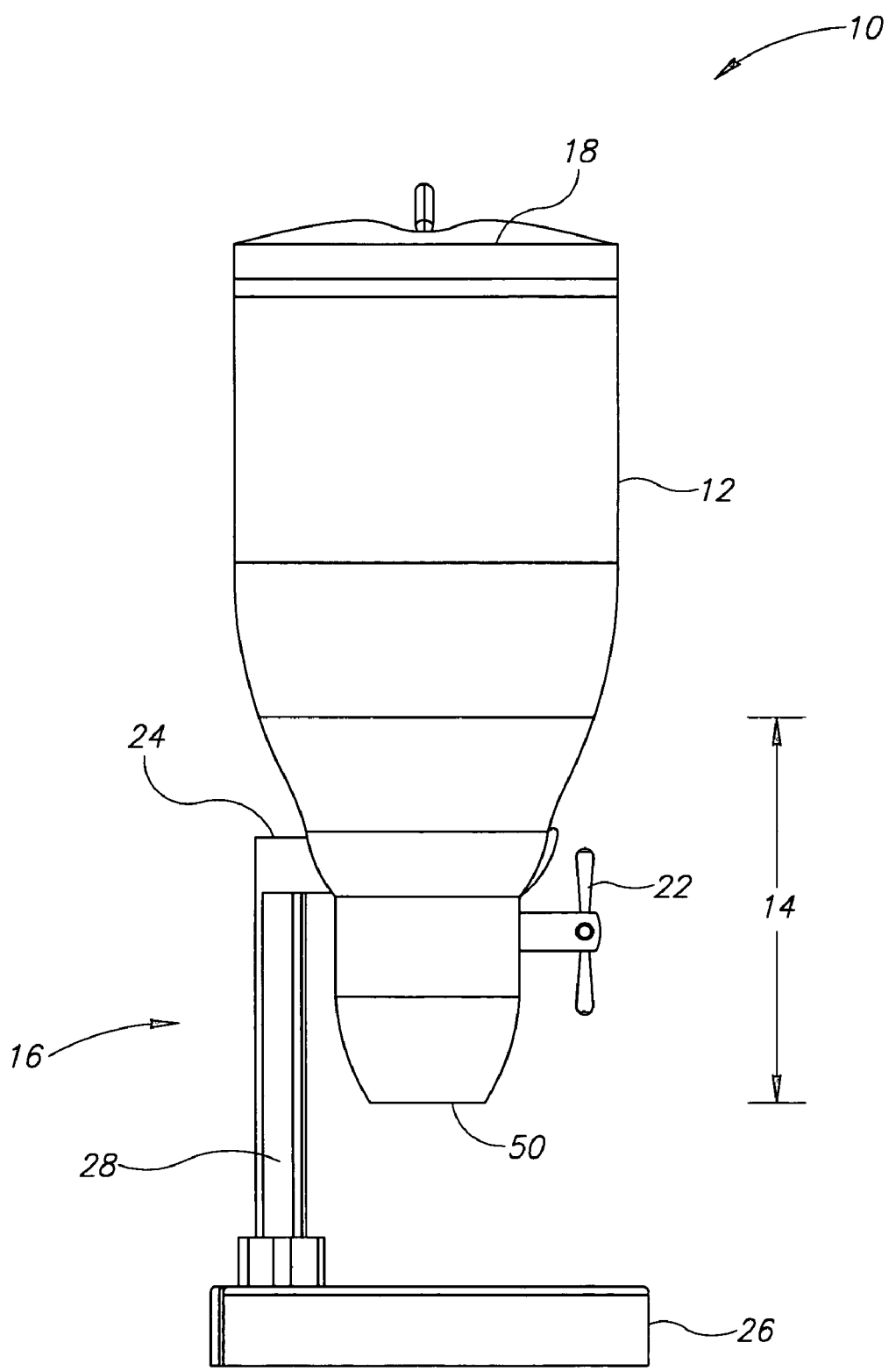
FIG. 5 illustrates a side view of the assembled system of FIG. 1.

Referring to FIG. 5, a side view is shown of the assembled system 10. System has been previously shown in front view in FIG. 1.

According to one embodiment, the spacing between the lower (dispensing) end of the receptacle, and the base can be adjusted, so that receiving bowls of various dimensions can be placed upon the base. When a particularly large receiving bowl is to be filled, the receptacle can be secured upon the support at a raised position from which dispensing will proceed.

Figure 6:
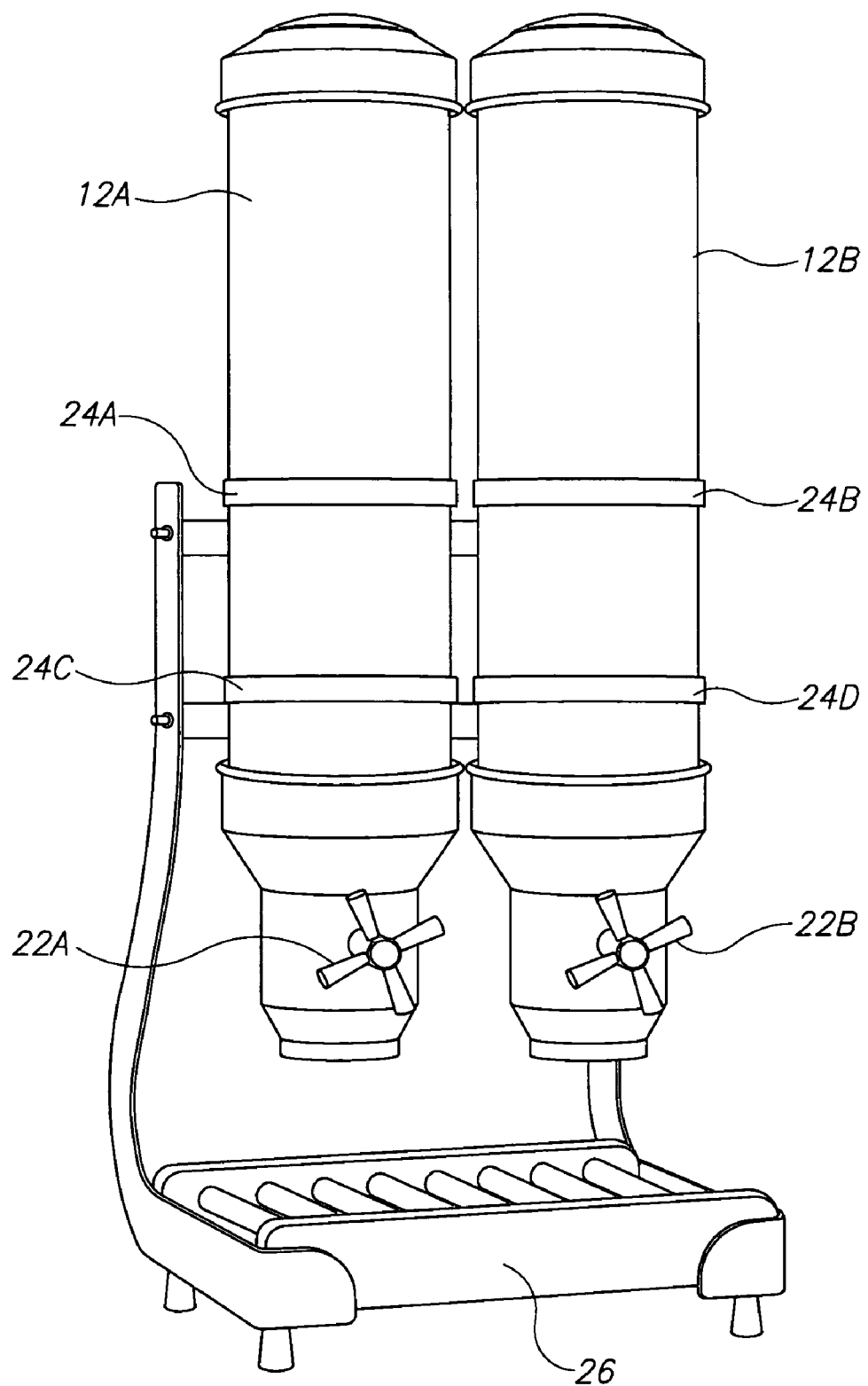
FIG. 6 illustrates a multi-system, mounted on a single support stand, for storing and dispensing two different types of products.

Referring to FIG. 6, a multi-system embodiment is shown having twin receptacles and their associated dispensing mechanisms, mounted in a side-by-side manner on a single support stand, for storing and dispensing two different types of cereal. Receptacles 12a, 12b are designed as elongated cylinders, and two retaining arms 24a, 24c and 24b, 24d removably receive each of the receptacles 12a, 12b and secure them in place. In this embodiment, the receptacles 12a, 12b are formed of plexi-glass, while the handles 22a, 22b and the retaining arms 24 are formed of metal, for a modern aesthetically pleasing appearance. Support base 26 is metal or wooden. The support base 26 is slotted, so that a receiving bowl may be placed upon it, and if cereal spillage occurs, cereal pieces will enter between the slots to reach a removable tray (not shown) present beneath the slots. This allows a tidy appearance, and easy clean-up.

Figure 7:
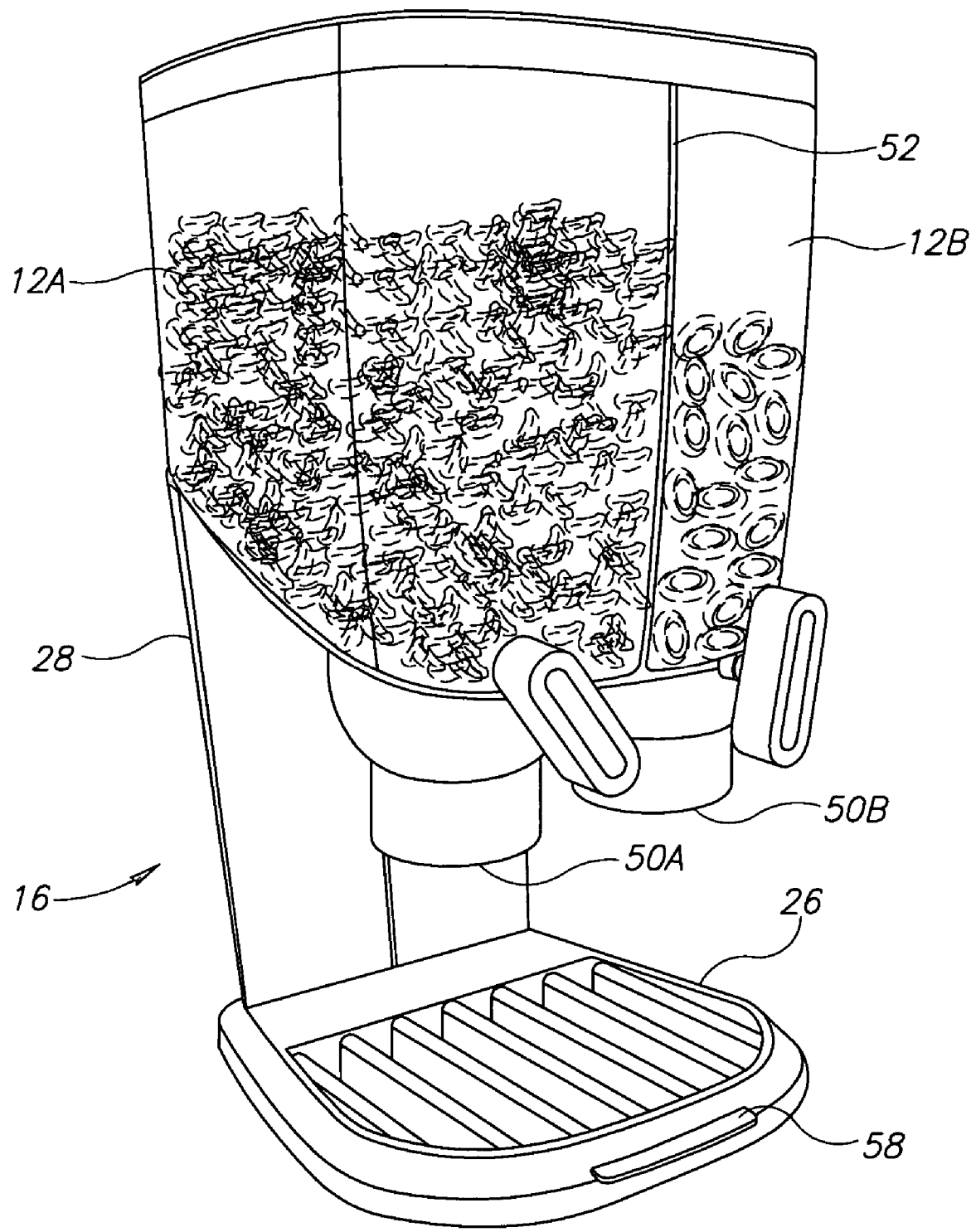
FIG. 7 illustrates an additional embodiment of a multi-system, with both receptacles sharing a common partition wall.

Referring to FIG. 7, an additional multi-system embodiment of twin systems is illustrated, with the receptacles 12a, 12b sharing a common partition wall 52. This arrangement can be more compact than that described in FIG. 5, for saving of space in the kitchen. The shared partition wall additionally allows proximity of the dispensing apertures 50a, 50b, for optional dispensing of two different cereals into a single receiving bowl, placed upon base 26. Vertical portion 28 of the support 16 is a single broad unit, which removably retains receptacles 12a, a2b Optionally, the dispensing apertures may be joined into a single spout from which cereal can flow into a receiving bowl. Support base 26 is slotted, and a removable tray (not shown) present beneath the slotted area may be taken out to remove spilled cereal pieces, by pulling on tab 58.

Figure 8:
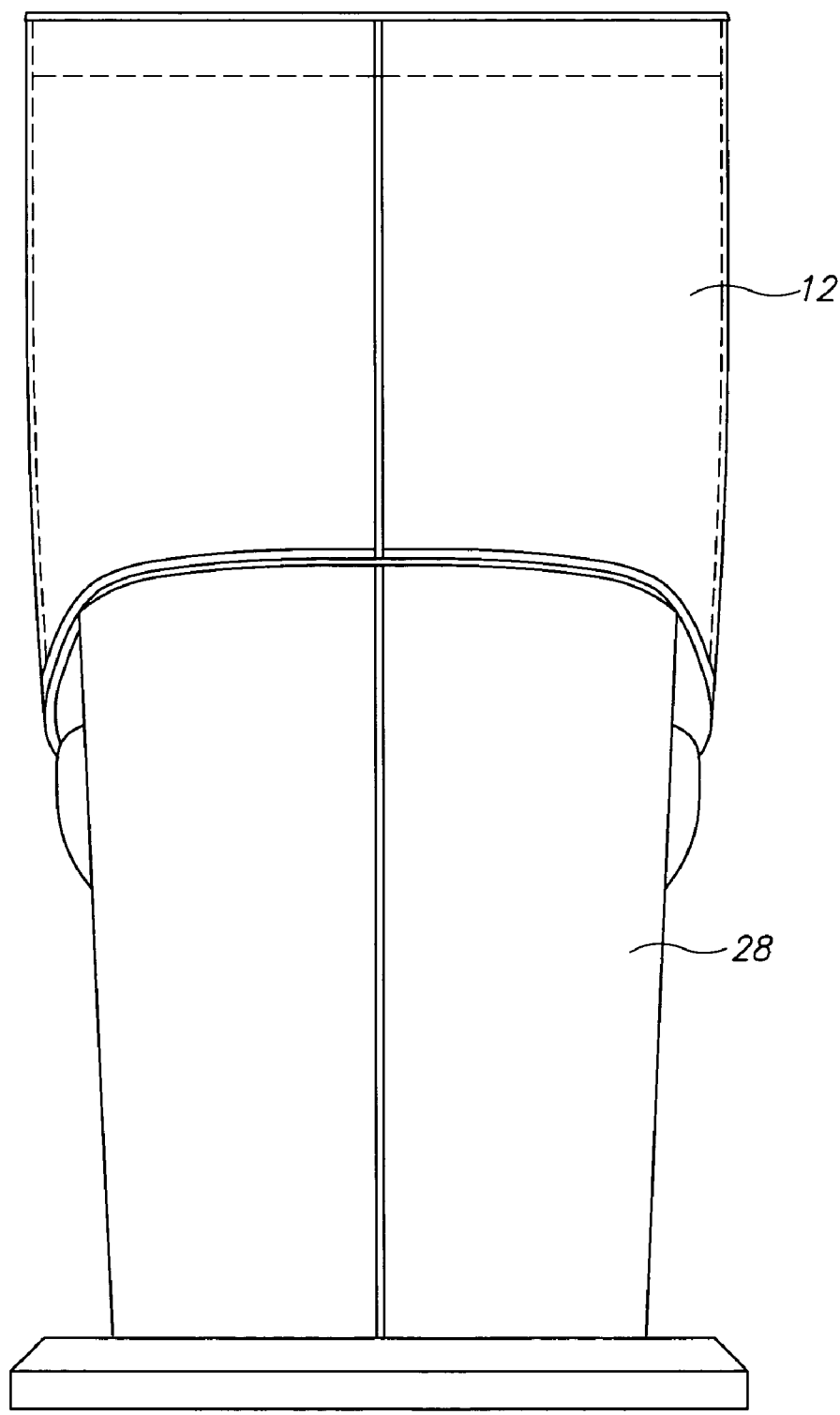
FIG. 8 is a rear view of the multi-system of FIG. 7.

Referring to FIG. 8, a rear view of the multi-system for storage and dispensing of two different cereals, described in FIG. 7, is shown. The rear wall of receptacle 12 fits over vertical portion 28 of stand during cereal storage and dispensing. The receptacle 12 can be easily lifted off of stand to release a single receptacle unit 12, allowing cleaning of the receptacle 12.

A greater number of dispensing receptacles can be mounted side by side in a manner similar to that shown in FIGS. 6, 7 for storage and dispensing of a greater number of different granular products. For instance, three cereals can be stored and dispensed from a three-receptacle dispenser, and four cereals can be stored or dispensed from a four-receptacle dispenser. Alternatively, two different cereals and a granular coffee can be dispensed from a three-receptacle dispenser, in which one receptacle and its associated dispensing mechanism have been adapted by sizing it to suit dispensing coffee.

In the embodiments described in FIGS. 6, 7 a plastic nut is not present upon the shaft. The shaft is retained in place in the through holes without use of a securing nut, rather the specific length and diameter of the shaft and the diameter of the through holes guarantee retention of the shaft within the through holes.

Figure 9:
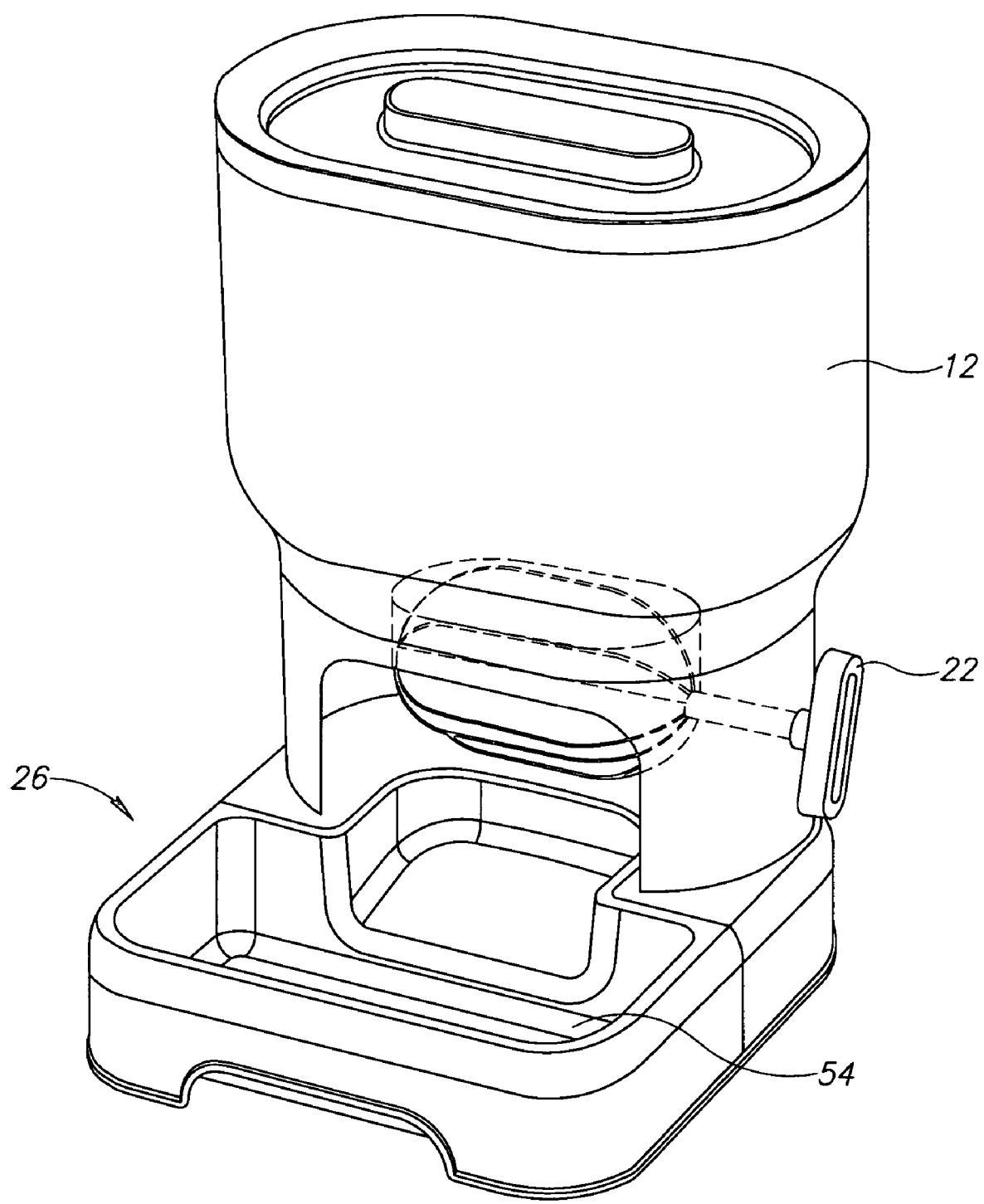
FIG. 9 illustrates a pet food dispensing system.

Referring to FIG. 9, a pet food dispensing system is shown. The handle 22 is located on a side of the receptacle 12, to allow a pet access to a dish 54 located in the base 26. When the pet owner rotates the handle 22, pet food is dispensed into the dish 54, and the pet can feed directly from this dish 54. Note that receptacle 12 is supported directly by base 26, without need for a separate stand. In one embodiment, the dish 54 is removable from the remainder of the base 26, to allow cleaning of the dish. The impeller 32 is lengthened and elliptical in shape, to give a large portion size for each measuring compartment. The shape of the receptacle 12 is designed so that it will not require a great amount of floor-space, since the receptacle is relatively narrow, however it is stable enough so that it will not tip over if accidentally nudged by the pet. Optionally a rubber under-bottom may be present under the base, to increase friction with the floor and prevent tipping of the system.

Figure 10:
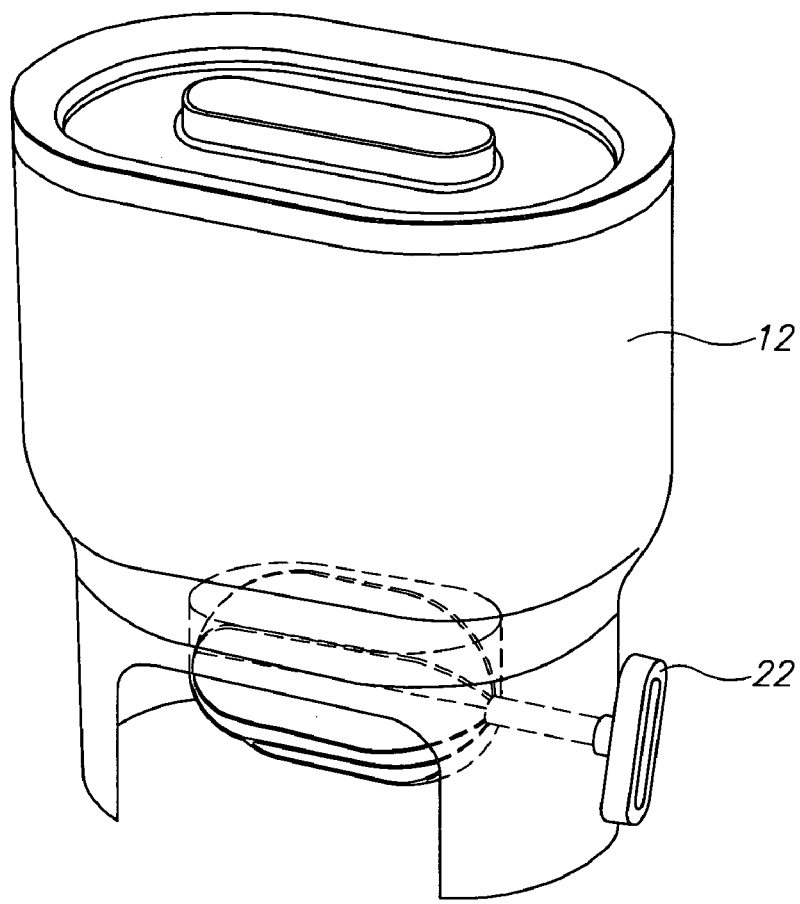
FIG. 10 illustrates a disassembled pet food dispensing system.
Figure 10:
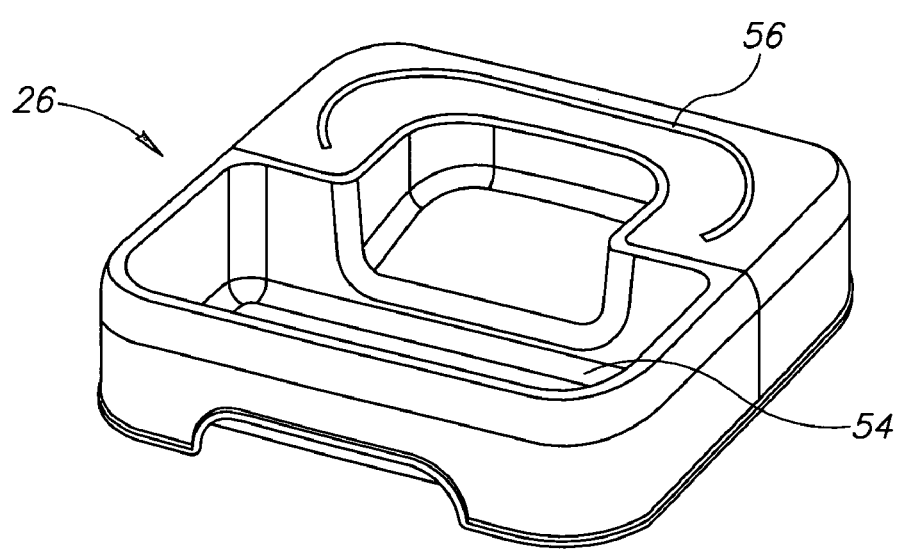

Referring to FIG. 10, when cleaning of the dish 54 is necessary, receptacle 12 is easily lifted upwards out of recess 56 in base 26 to detach receptacle 12 from base 26, and allow cleaning of base 26.

Figure 11:
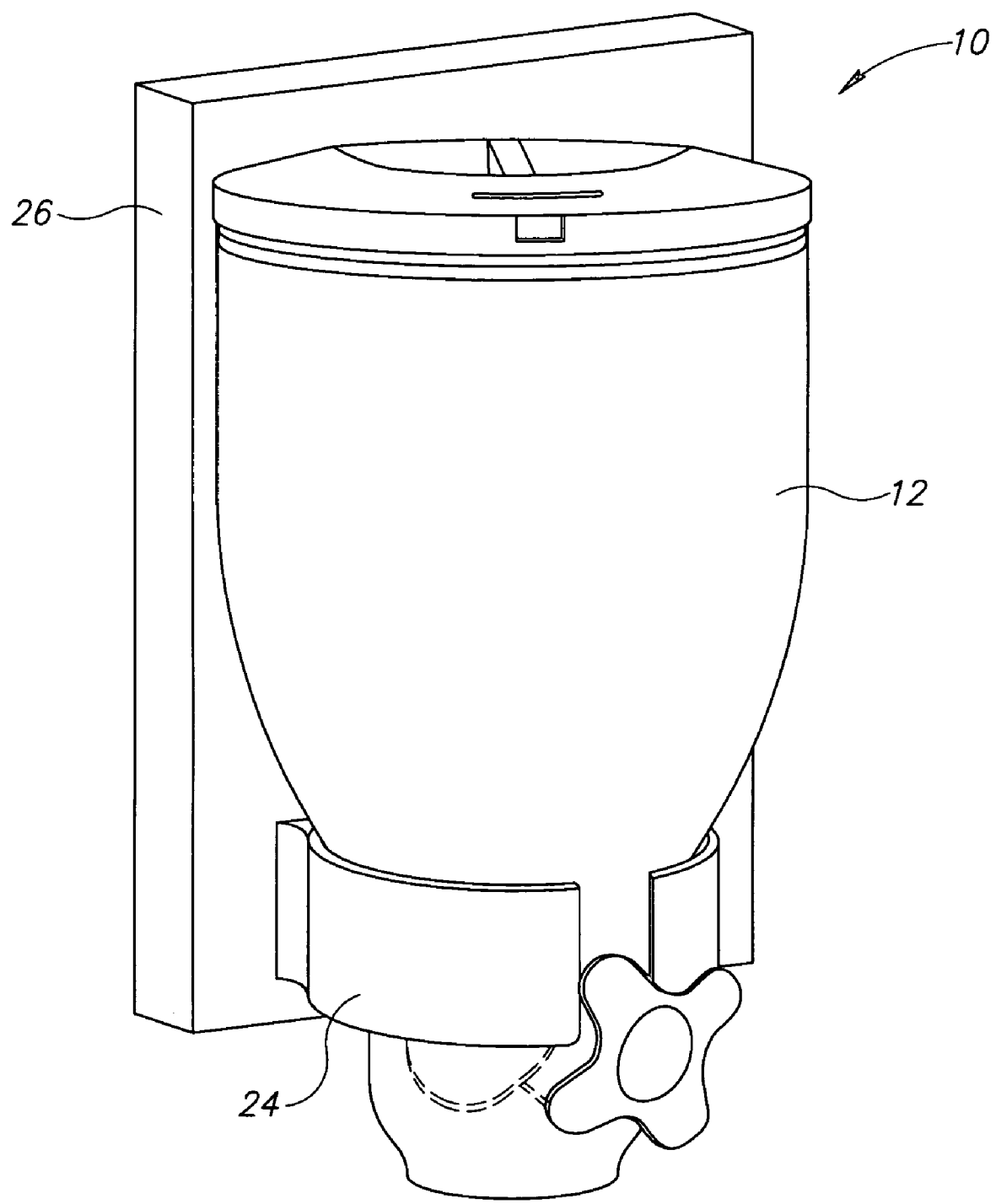
FIG. 11 illustrates a wall-mounted dispensing system.

Referring to FIG. 11, a wall-mounted dispensing system is shown. System 10 is secured to wall via vertical wall-mountable base 26 present behind the receptacle 12. The receptacle 12 is removably received in retaining arm 24 protruding from wall-mountable base 26.

Figure 12:
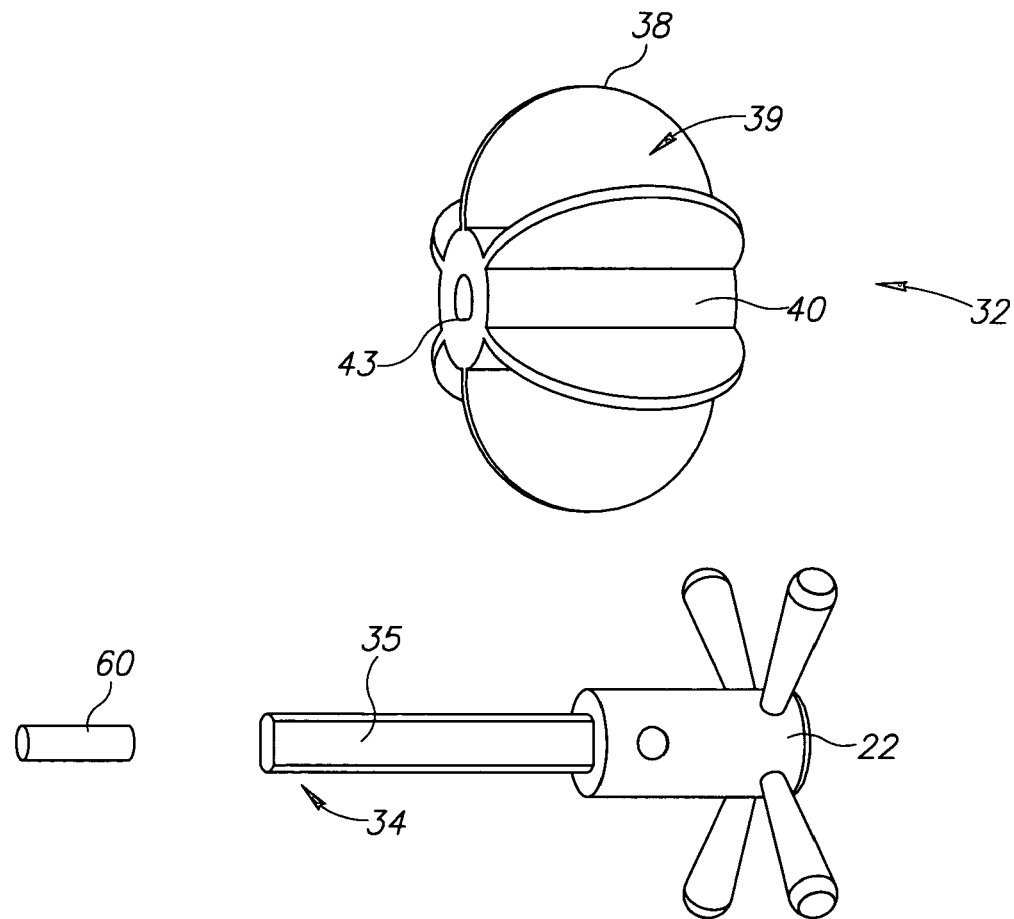
FIG. 12 is an exploded view of another embodiment of a dispensing mechanism.

Referring to FIG. 12, in another embodiment of the dispensing mechanism, shaft 34 is shortened, and when inserted into the hollow core 40 of the impeller 32, extends only partway through the impeller 32. An adaptor pin 60 is inserted into the core 40 of the impeller 32 to protrude from one side of the impeller 32.

Figure 13:
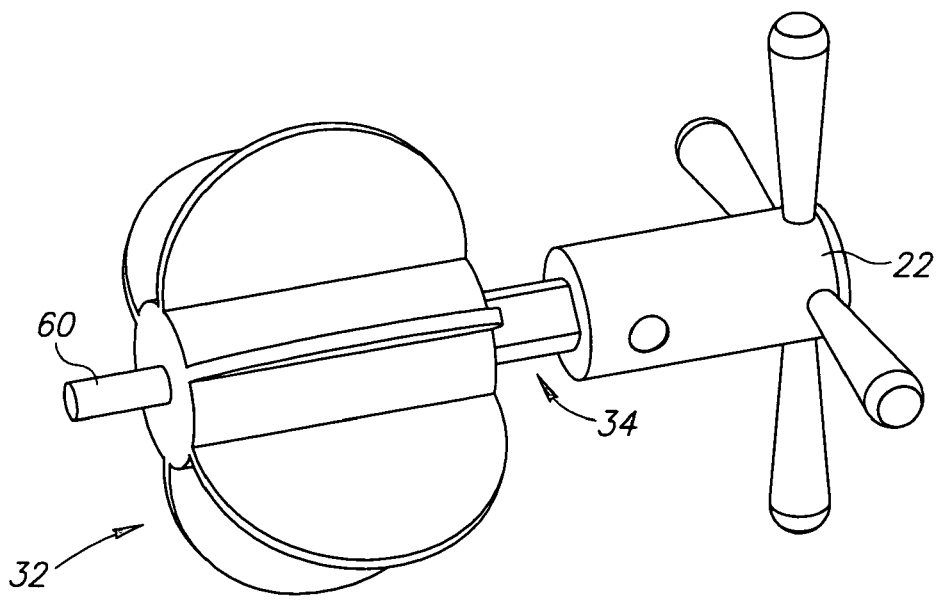
FIG. 13 is the dispensing mechanism of FIG. 12, after assembly.

Referring to FIG. 13, after assembly, the shortened shaft 34 protrudes from a first side of the impeller 32, and is connected to the handle 22 at that first side. Adaptor pin 60 extends from the second side of the hollow core 40 of the impeller 32, and may contact the second end of the shaft 34 within the hollow core 40. The adaptor pin 60 extends beyond the impeller 32 to enter the second through hole 41 on the receptacle and rotatably hold the shaft 34 in the neck.

In all embodiments of the present invention, rotation of the handle in either a clockwise or counterclockwise direction will accomplish identical dispensing results, as long as the handle is rotated to a sufficient extent so as to align a filled serving compartment with the dispensing aperture.

Figure 14:
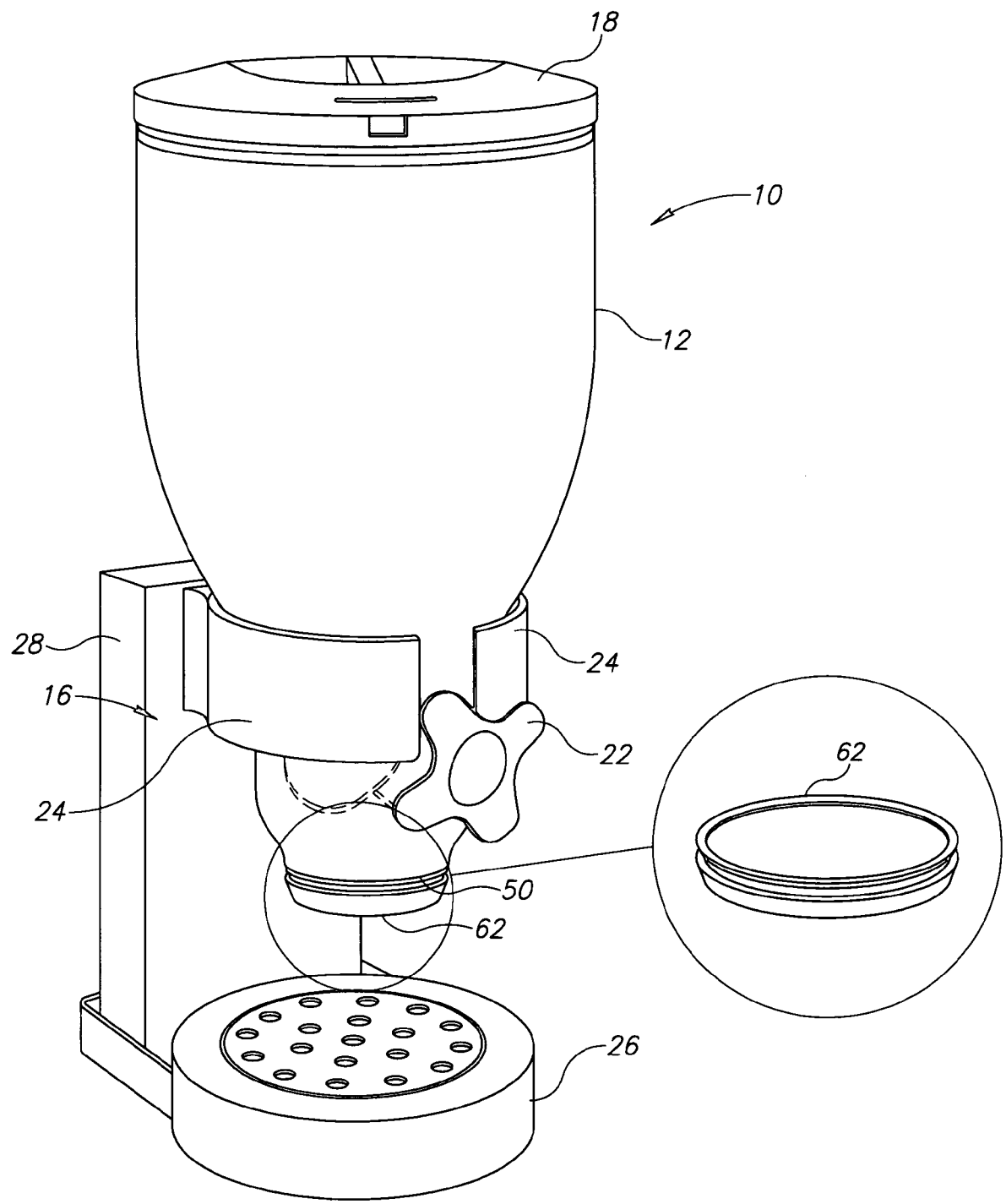
FIG. 14 is a dispensing system having a cap fitted over the dispensing aperture for maintaining the freshness of the product.

Referring to FIG. 14, in one embodiment of the invention, a cap 62 is externally fitted over the dispensing aperture 50, to seal the aperture 50 so that freshness of the contents of the receptacle 12 is maintained in environments having extreme moisture content. In a multi-system having several dispensing receptacles on a single stand, one can envision either a single lengthened cap contoured to seal all dispensing apertures, or several individual caps as are shown in FIG. 14.

In the present invention, optionally, the retaining arm receiving the receptacle can be replaced with a retaining chain or with a flexible retaining band.

The present invention thus provides a dispensing system having minimal components, allowing easy disassembly for cleaning and allowing ease of manufacture. The invention provides freshness-sealing of the food product placed within the receptacle, due to the dimensions, shape and flexible nature of the impeller provided. Such freshness-sealing is novel to the present invention, and is of significant importance in food products.

Having described the invention with regard to certain specific embodiments thereof, it is to be understood that the description is not meant as a limitation, since further modifications will now suggest themselves to those skilled in the art, and it is intended to cover such modifications as fall within the scope of the appended claims.

The invention claimed is:

1. A system for measuring and dispensing a predetermined quantity of a granular product, the system comprising:
    a receptacle having a lower end defining a neck portion having an inner wall forming a dispensing aperture;
    an impeller rotatably disposed in said neck portion and having a hollow central core rotatably mounted at one end on a shaft and at its other end on a co-axial, integrally form-fitted adaptor pin, said shaft and adaptor pin each being respectively supported by one of first and second oppositely-located through-holes formed in said receptacle neck portion, said impeller including a plurality of flexible blades configured to sealingly engage said inner wall of said receptacle, for maintaining the hygiene and freshness of the granular product, said flexible blades defining a predetermined measured volume between adjacent ones thereof and said inner wall of said neck portion,
    a handle secured to said impeller shaft for rotating said impeller;
    means for determining that said handle is rotated to a sufficient extent so as to align said predetermined measured volume with said dispensing aperture, thus insuring portion control; and
    a support for releasably receiving and supporting said receptacle a spaced distance from a supporting surface;
    wherein granular product filling an upper end of said receptacle will move therefrom into said neck portion where said predetermined measured volume of the granular product is aligned with and dispensed through said aperture substantially without breakage in response to rotation of said handle, said system being capable of easy disassembly for cleaning, said disassembly being performed by removal of said receptacle from said support and by removal of said shaft external to said receptacle via said first through-hole followed by removal of said integrally form-fitted adaptor pin end of said hollow central core from said second through-hole internal to said receptacle, enabling removal of said impeller through said upper end of said receptacle, said system being capable of re-assembly by replacing said impeller inside said receptacle through said upper end so as to align and insert said integrally form-fitted adaptor pin end within said second oppositely-located through-hole from within said receptacle and anchoring it therein, followed by replacement of said shaft via said first oppositely-located through-hole, which is easily aligned with said impeller hollow central core, thus enabling easy interchangeability of said impeller and adjustable portion control, by variation of said predetermined measured volume associated with a replacement impeller.

2. The system of claim 1 wherein said support comprises:
a support stand having a base portion, an upward portion extending generally outwardly from said base portion, and a retaining arm portion extending generally outwardly of said upward portion, a spaced distance from said base portion, said arm portion being arranged for releasably receiving said receptacle.

3. The system of claim 2, wherein said base portion comprises a slotted portion upon which a receiving bowl may be placed for filling with a predetermined measured volume of a dispensed granular product, and a removable tray situated below said slotted portion, said removable tray allowing for easy cleaning and removal of spilled product from said slotted portion.

4. The system of claim 3, wherein said support holds said receptacle in an elevated orientation to allow the insertion of said receiving bowl beneath said dispensing aperture.

5. The system of claim 4, wherein the location of said receptacle upon said support is adjustable in the vertical direction, allowing adjustment of the spacing between the lower end of the receptacle and the supporting surface, for placement of receiving bowls of various dimensions under the lower end of said receptacle.

6. The system of claim 1, wherein said flexible impeller is formed of a material selected from the group consisting of silicone, plastic and rubber.

7. The system of claim 1, wherein said handle is situated on a front side of said neck portion for direct access thereto.

8. The system of claim 1 wherein rotation of said impeller brings a first of said measuring cavities into an upwardly facing position such that said cavity is filled with granular product contained within said receptacle, and further rotation of said impeller brings said cavity opposite said dispensing aperture, thereby dispensing a predetermined quantity of granular product.

9. The system of claim 1 wherein the lower end of said receptacle is shaped as a funnel comprising a downwardly-tapering portion from which said neck extends downwardly therefrom.

10. The system of claim 1 wherein said receptacle is provided with a removable and resealable upper lid.

11. The system of claim 1 for use as a cereal dispenser upon filling said receptacle with cereal.

12. The system of claim 1 for use in dispensing a granular food product selected from the group consisting of: nuts, candy, pretzels, confections, rice, beans, and coffee, upon filling said receptacle with said selected granular food product.

13. The system of claim 1, wherein the diameter or radial cross-section of said impeller as measured across two generally opposing blades, is slightly larger than that of said neck, providing sealing of said neck for maintaining the freshness of a granular product.

14. The system of claim 1, wherein said handle is situated on the right side or left side of said neck portion with respect to a user facing said supporting surface.

15. The system of claim 1, wherein said impeller comprises a plurality of semicircular flexible blades.

16. A multi-system for measuring and dispensing a predetermined quantity of a plurality of granular products, comprising:
a plurality of receptacles, each with its associated rotatable dispensing impeller and handle as described in claim 1, wherein said plurality of receptacles are supported by a single base having a plurality of retaining means for removably receiving said plurality of receptacles therein.

17. The multi-system of claim 16, wherein one of said receptacles and its associated impeller differ in size from said remaining receptacles, for dispensing a granular product having characteristics which differ significantly from the granular product to be dispensed from the remaining receptacles.

18. The multi-system of claim 17, wherein one of said receptacles is sized to dispense coffee, and the remainder of said receptacles are sized to dispense processed cereal flakes having a bulky form.

19. The multi-system of claim 16, wherein at least two of said receptacles share a common partition wall.

20. The system of claim 1, for use in dispensing pet food, upon filling said receptacle with same.

21. The system of claim 20, further comprising a dish from which a pet may feed, present under said dispensing aperture.

22. The system of claim 21, wherein said handle is situated on the right side or left side of said neck portion with respect to a user facing said supporting surface, allowing a pet access to said dish.

23. The system of claim 21, wherein said dish is removable from under said dispensing aperture, allowing cleaning of said dish.

24. The system of claim 1, wherein said support comprises a base, and recesses are present in said base for insertion of said receptacle therein, such that said receptacle is supported directly by said base, and said receptacle is removable from said recesses for cleaning of said system.

25. The system of claim 1, wherein said system is provided with wall-mounting means.

26. The system of claim 25, wherein said wall-mounting means comprise a vertical wall-mountable base having a retaining arm protruding horizontally therefrom, and said receptacle is removably received in said retaining arm protruding from said wall-mountable base.

27. The system of claim 1, wherein said handle is rotatable in both a clockwise and a counterclockwise direction, wherein rotation in either direction results in dispensing of said product when a filled measuring compartment becomes aligned with the dispensing aperture.

28. The system of claim 1, wherein the diameter or radial cross-section of said impeller as measured across two generally opposing blades, is similar to that of said neck, providing sealing of said neck for maintaining the hygiene and freshness of a granular product.

29. The system of claim 1 wherein said impeller comprises a hollow central core and a shaft which extends into said hollow core of said impeller, wherein a first end of said shaft extends beyond a through-hole formed in the neck portion to mate with a handle for turning said shaft to rotate said impeller, and a second end of said shaft is rotatably held within said neck portion such that said shaft is in a horizontal plane.

30. The system of claim 29 wherein said shaft is provided with securing means to secure said shaft within said neck.

31. The system of claim 29, wherein said securing means comprise a threaded nut, which mates with a threaded portion on one end of said shaft.

32. The system of claim 29, wherein said shaft is provided with a flat side, which mates with a flat side present upon the inner side of the core of said impeller, said mating ensuring that rotation of said shaft via rotation of said handle results in rotation of said impeller.

33. The system of claim 29, wherein the second end of said shaft extends beyond a second through-hole formed in said neck, said second through-hole positioned diametrically opposite said first through-hole.

34. The system of claim 29, wherein said integrally form-fitted adaptor pin extends from one end of the hollow core of said impeller, said integrally form-fitted adaptor pin extending beyond said impeller to enter said second through-hole formed in said neck, for rotatably holding said impeller in said neck.

35. The system of claim 29, wherein said retaining means for removably receiving said receptacle therein, are selected from the group consisting of: a retaining chain and a flexible retaining band.

36. A system for measuring and dispensing a predetermined quantity of a granular product, the system comprising:
　a receptacle having a lower end defining a neck portion with a dispensing aperture;
　a rotatable impeller disposed in said neck portion and having a hollow central core rotatably mounted on a shaft supported at its ends by first and second oppositely located through-holes formed in said receptacle neck portion, said impeller including a plurality of flexible blades that abut inner walls of said neck portion and form a seal therewith, adjacent ones of said plurality of flexible blades defining measuring cavities
　said flexible blades being formed of material having sufficient flexibility to prevent breakage of the granular product, said material being selected from silicone, rubber and the like,
　said impeller having an integrally form-fitted adaptor pin at one end of said hollow central core for rotatable mounting in second said through-hole;
　a handle secured to said impeller for turning said impeller;
　means for determining that said handle is rotated to a sufficient extent so as to align said measuring cavities with said dispensing aperture, thus insuring portion control; and
　a support stand for releasably receiving said receptacle a spaced distance from a supporting surface, said support stand including a base portion for engaging the supporting surface and a connecting portion for receiving said receptacle,
　the granular product moving from said receptacle to a measuring cavity and through said dispensing aperture substantially without breakage in response to rotation of said handle,
　wherein said system is capable of easy disassembly for cleaning, said disassembly being performed by removal of said receptacle from said support stand and by removal of said shaft external to said receptacle via said first through-hole followed by removal of said integrally form-fitted adaptor pin end of said hollow central core from said second through-hole internal to said receptacle enabling removal of said handle and impeller through upper end of said receptacle,
　thus enabling easy interchangeability of said impeller and adjustable portion control, by variation of said predetermined measured volume associated with a replacement impeller.

37. The system of claim 1, further comprising a cap shaped to seal the dispensing aperture, for maintaining freshness of the contents of the receptacle.

38. The multi-system of claim 16, further comprising a cap contoured to seal all dispensing apertures for maintaining freshness of the contents of the receptacles.

39. A method for disassembly and cleaning of a dispensing mechanism for dispensing a predetermined measured quantity of a granular product, after being emptied of any granular product residue, wherein the dispensing mechanism comprises:
　a receptacle having a lower end defining a neck portion having an inner wall forming a dispensing aperture;
　an impeller rotatably disposed in said neck portion and rotatably mounted to said receptacle, said impeller including a plurality of flexible blades configured to sealingly engage said inner wall of said receptacle, a predetermined measured volume defined between adjacent ones of said flexible blades and said inner wall of said neck portion;
　a stand for removably supporting said receptacle; and
　a handle rotatably secured to said impeller for rotating said impeller, said handle mounted on one end of a removable shaft inserted within a hollow core of said impeller and supported by oppositely-located first and second through-holes formed in said receptacle,
　said impeller having an integrally form-fitted adaptor pin at one end of said hollow central core for rotatable mounting in one of said through-holes,
　such that the granular product filling an upper end of said receptacle will move therefrom into said neck portion such that a predetermined measured volume of the granular product is dispensed substantially without breakage through said aperture in response to rotation of said handle,
　said disassembly and cleaning method comprising:
　　removing said receptacle from said stand;
　　withdrawing said shaft from said hollow core by pulling on said handle connected to said shaft;
　　removing said integrally form-fitted adaptor pin end of said hollow central core from said one of said through-holes internal to said receptacle; and
　　lifting said impeller out of said receptacle;
　　wherein said receptacle, said fastener, said shaft and handle, and said impeller are then cleanable prior to reassembly.

40. The method of claim 39, wherein said dispensing mechanism is reassembled after cleaning in a method comprising:
　replacing said receptacle into said stand;
　replacing said impeller inside said receptacle so as to align said integrally form-fitted adaptor pin end of said hollow central core with one of said oppositely-located through-holes so as to anchor it therein;

inserting said shaft via a first of said through-holes and into said hollow core to securely and sealably hold said impeller in rotatable contact with said inner wall of said receptacle; and refilling a quantity of granular product into said receptacle ready for dispensing in said predetermined measured volume by rotation of said handle.

* * * * *